F. TOTH.
RAILROAD SPIKE.
APPLICATION FILED MAY 20, 1919.
1,323,728.
Patented Dec. 2, 1919.
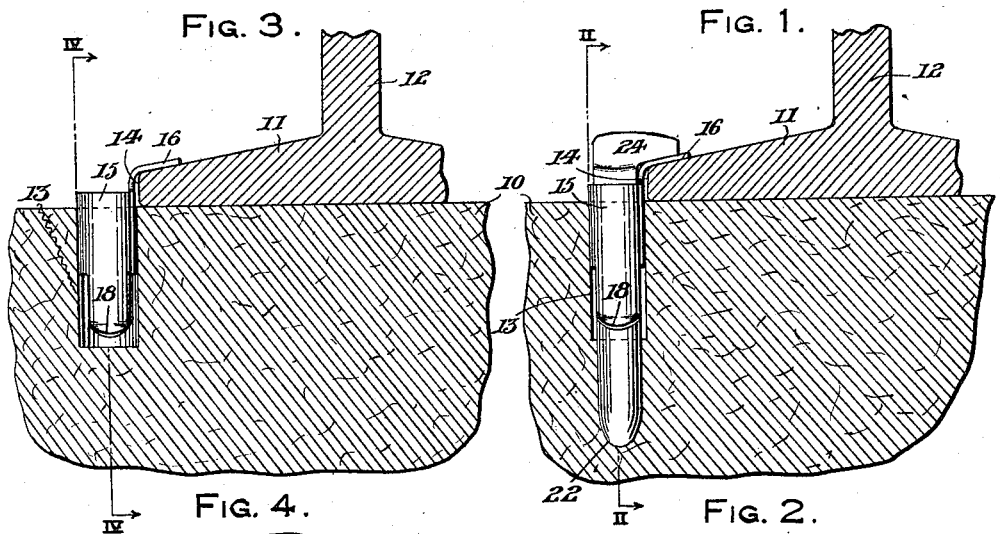
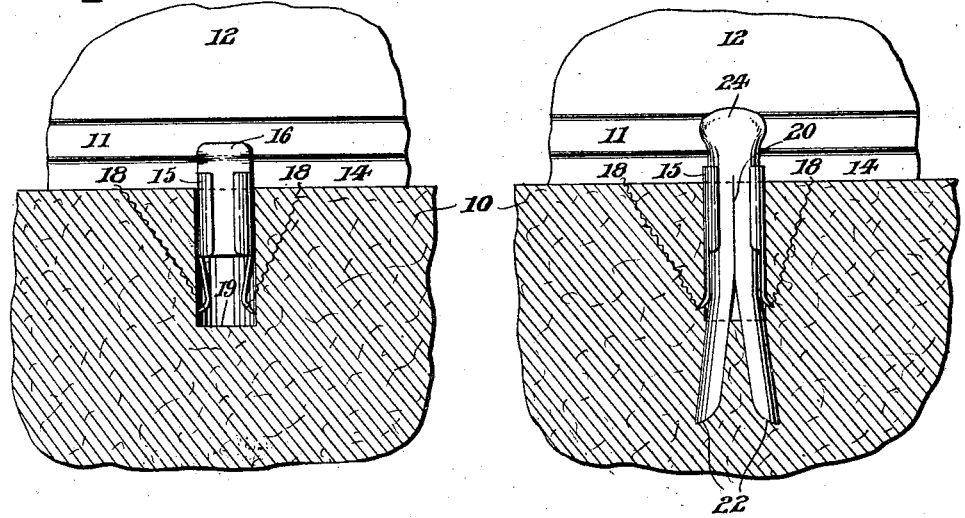
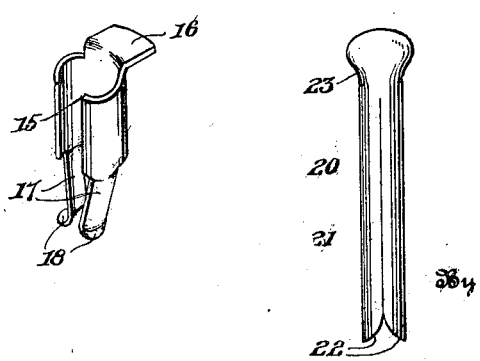
Inventor
F. Toth
By A. M. Wilson
Attorney

UNITED STATES PATENT OFFICE.

FRANK TOTH, OF TOLEDO, OHIO.

RAILROAD-SPIKE.

1,323,728.  Specification of Letters Patent.  Patented Dec. 2, 1919.

Application filed May 20, 1919. Serial No. 298,481.

*To all whom it may concern:*

Be it known that I, FRANK TOTH, a citizen of Hungary, residing at Toledo, in the county of Lucas and State of Ohio, have invented certain new and useful Improvements in Railroad-Spikes, of which the following is a specification.

The primary object of the invention is the provision of a spike especially adapted for railroad use designed for automatic locking in position when placed into engagement with the work.

A further object of the invention is to provide holding means adapted for driving into the work and providing a double lock against removal therefrom, the structure being simple and inexpensive to manufacture but possessing great strength and utility.

With these general objects in view, the invention will be now fully described in connection with the accompanying drawing, and in which like reference characters designate corresponding parts throughout the several views.

In the drawing,

Figure 1 is a transverse sectional view of a portion of a railway tie and rail, illustrating my invention in locked connection therewith, Fig. 2 is a vertical sectional view taken upon line II—II of Fig. 1, Fig. 3 is a view similar to Fig. 1, before the spike has been inserted, Fig. 4 is a vertical sectional view taken upon line IV—IV of Fig. 3, Fig. 5 is a perspective view of the locking sleeve employed and Fig. 6 is an elevational view of my form of spike.

Referring more in detail to the drawing it will be understood that the invention is adaptable for securing different forms of members together, but being especially serviceable upon railroads, it is herein illustrated serving as locking means between the wooden tie 10 and the base flange 11 of a usual form of rail 12. A socket 13 is bored adjacent the outer edge 14 of the flange 11 and a split sleeve 15 formed of resilient metal is sprung into the said socket. The sleeve 15 is provided with an angular lip 16 overlying the flange 11, the resiliency of the sleeve temporarily retaining the latter in the socket 13.

Depending arms 17 project from the opposite sides of the sleeve 15 being bent inwardly toward each other during the initial insertion of the sleeve in the socket 13, the lower ends of the arms being in the form of sharpened claws 18 for engaging the opposite sides of the socket.

Any form of spike or nail may then be driven into the bottom 19 of the socket 13 through the sleeve 15 and having sufficient diameter to spread the arms 17 for engaging the claws 18 into the sides of the socket, the preferable form however being the spike best illustrated in Fig. 6.

The spike 23 has a longitudinal cut or slit 20 forming opposite bifurcations or halves 21 with sharpened lower ends 22. The inward beveling of the ends 22 as illustrated insures the spreading apart of the halves 21 upon driving the spike 23 into the socket bottom 19, the halves 21 bending outwardly and locking the spike upon the work. The outward flaring of the halves 21 affords greater pressure upon the arm 17 forcing the claws 18 securely into the sides of the socket 13 and retaining the same locked in their engaging positions. The head 24 of the spike preferably overlies the lip 16, the said lip and head bearing upon the flange 11 and locking the rail upon the tie.

A strong connection is formed in this manner which is not easily released by the vibrations of the rail and tie under traffic conditions, the forcible removal of the spike 23 in any manner being exceedingly difficult.

The preferred form of the invention is herein set forth but it will be understood that minor changes may be made therein without departing from the spirit and scope of the invention as claimed.

What I claim as new and desire to secure by Letters Patent is:—

In combination with a member having a socket, a resilient sleeve resiliently seated in said socket, a holding lip at the top of the sleeve, resilient claws upon the sleeve within the socket, a bifurcated spike of a diameter substantially equal to the inner diameter of the sleeve, adapted for forcible movement longitudinally thereof whereby the claws are outwardly moved into the work simultaneously with the spreading of the spike, a projecting head upon the spike adapted for overlying said lip when engaging the work, the lower ends of the bifurcated portions of the spike being inwardly beveled.

In testimony whereof I affix my signature.

FRANK TOTH.